No. 798,480. PATENTED AUG. 29, 1905.
J. C. ANDERSON.
JAR.
APPLICATION FILED MAR. 9, 1905.
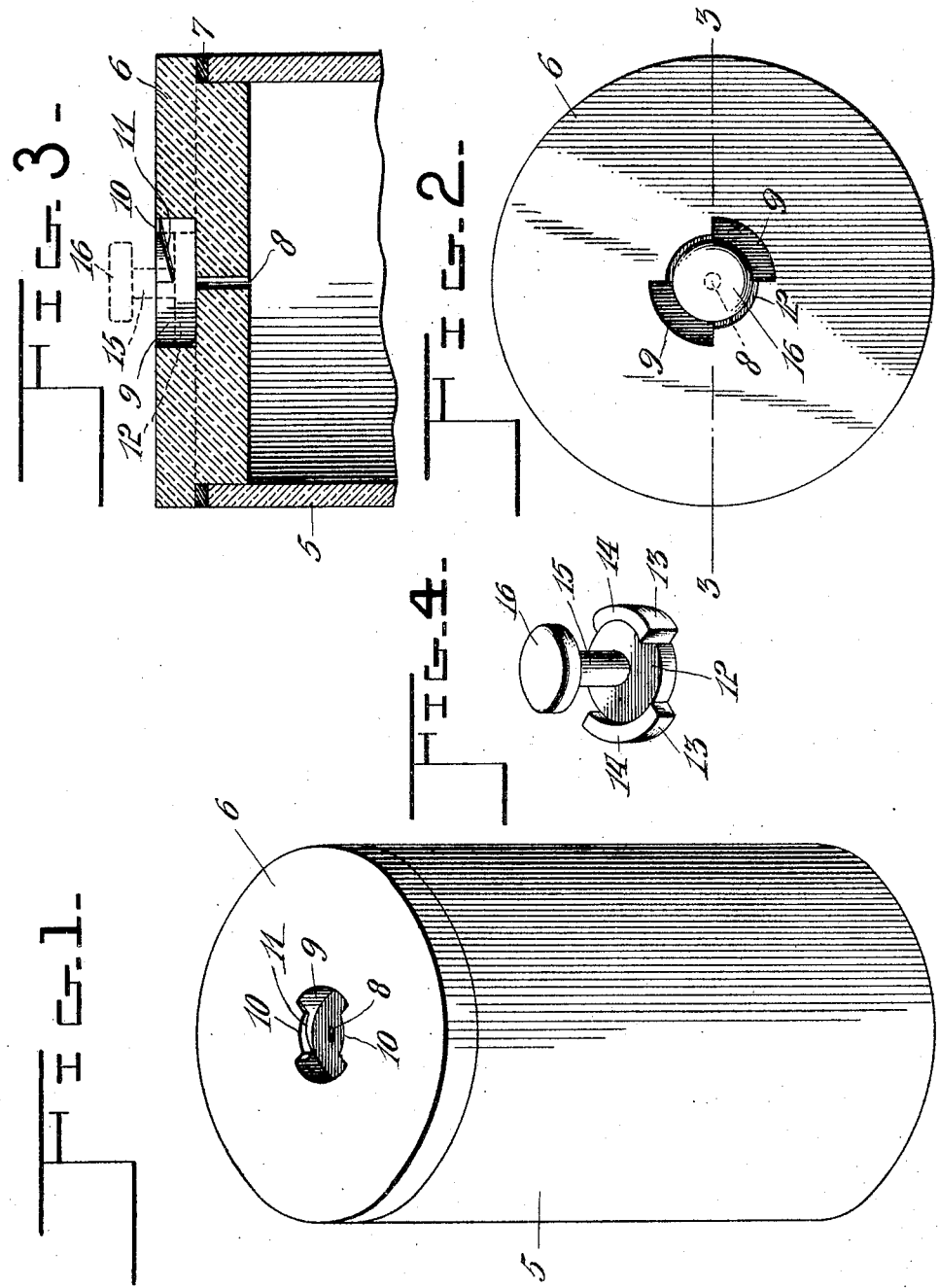
Witnesses,
James C. Anderson,
Inventor.
By
Attorneys

UNITED STATES PATENT OFFICE.

JAMES CRAWFORD ANDERSON, OF VICTORIA, CANADA.

JAR.

No. 798,480. Specification of Letters Patent. Patented Aug. 29, 1905.

Original application filed April 18, 1904, Serial No. 203,062. Divided and this application filed March 9, 1905. Serial No. 249,187.

*To all whom it may concern:*

Be it known that I, JAMES CRAWFORD ANDERSON, a subject of the King of Great Britain, residing at Victoria, county of Victoria, in the Province of British Columbia, Canada, have invented certain new and useful Improvements in Jars; and I do hereby declare that the following is a full, clear, and exact description of the invention, such as will enable others skilled in the art to which it appertains to make and use the same.

My invention relates to jars adapted to preserve food.

The object of my invention is to provide a vent and closure for the vent in the jar forming the subject-matter of my application, Serial No. 203,062, filed April 18, 1904, of which this is a divisional application; and my invention consists of the construction, combination, and arrangement of parts, as herein illustrated and described.

In the accompanying drawings, forming part of this application, I have illustrated one form of embodiment of my invention, in which drawings similar reference characters designate corresponding parts, and in which—

Figure 1 is a perspective view of a jar provided with the vent of my invention. Fig. 2 is a top plan view illustrating a jar-cover provided with the vent and closure of my invention. Fig. 3 is a central vertical section taken on the line 3 3 of Fig. 2, and Fig. 4 is a perspective view of the vent-closure of my invention.

Referring to the drawings, 5 designates a jar, and 6 a cover therefor, both preferably of non-metallic material, interposed between the meeting portions of which jar and cover is the usual packing-ring 7. The cover 6 is provided with the central air-passage 8, terminating in the enlarged outer recess 9, the walls of which are provided with the oppositely-disposed ears 10, the under surfaces of which ears are cam-shaped, as illustrated at 11, Fig. 3. Disposed in the recess 9 is a circular disk 12, provided with peripheral lugs 13, having upper cam-surfaces 14, as best shown in Fig. 4. The disk 12 is provided with the stud 15, on the outer end of which stud is a button 16.

My invention is particularly applicable for use in containing food which is in a heated condition when placed in the receptacle. The cover can then be placed on the jar and sealed down, and as soon as the heated gases have escaped through the vent-opening 8 the disk 12 is seated in the recess 9, and by means of the button 16 the disk is rotated until the cam-faces 14 engage the cam-faces 11, whereby the disk 12 is firmly locked over the vent-opening 8.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim, and desire to secure by Letters Patent, is—

1. In a jar provided with a cover having an opening therein communicating with an enlarged outer recess provided with ears, a circular disk disposed in said recess and provided with lugs adapted to engage said ears, and means for partially rotating said disk.

2. In combination with a cover having an opening therein communicating with an enlarged outer recess provided with ears having inclined under surfaces, a circular disk disposed in said recess and provided with lugs having inclined upper faces adapted to engage with said ears, a stud on said disk, and a button on said stud.

In witness whereof I have hereunto set my hand in the presence of two witnesses.

JAMES CRAWFORD ANDERSON.

Witnesses:
LOUISA C. NOBLE,
ROY E. PEABODY.